UNITED STATES PATENT OFFICE.

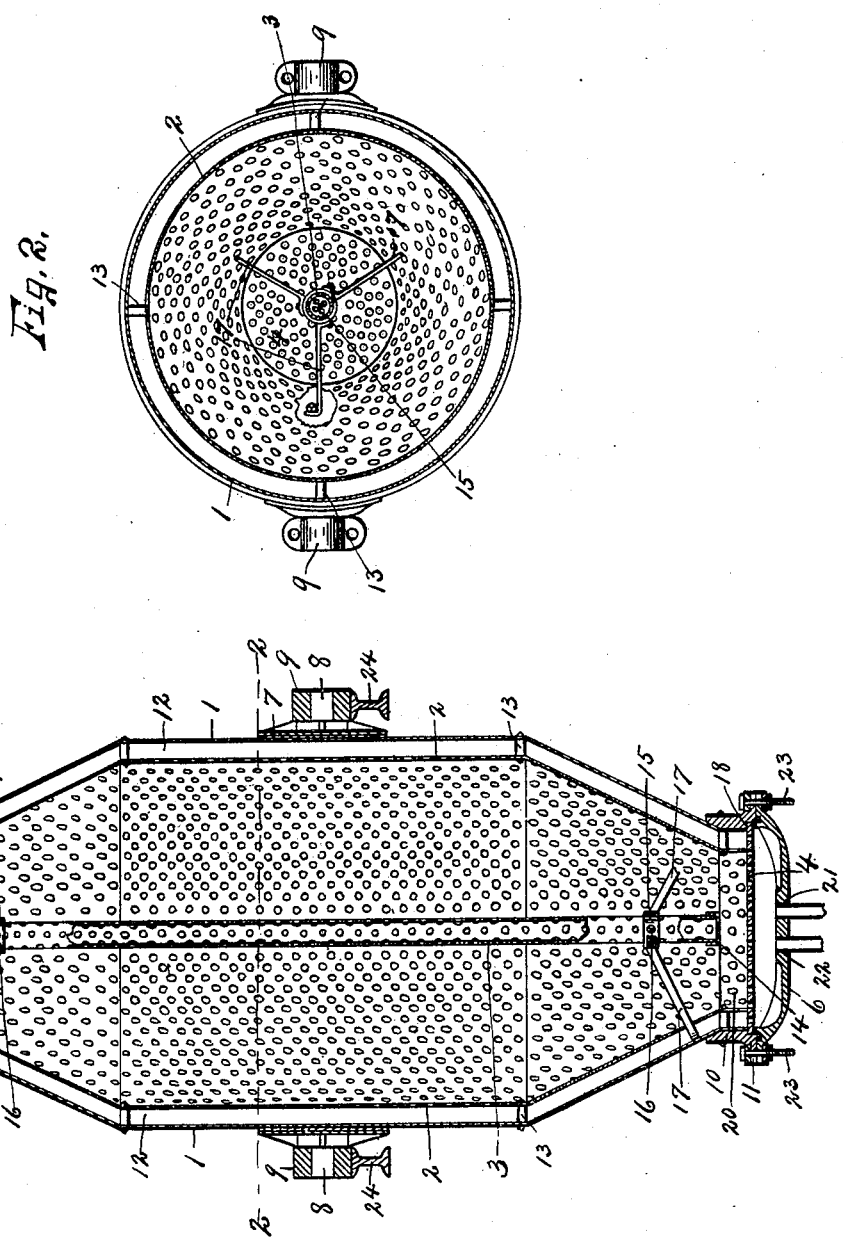

MANSFIELD J. FRENCH, OF SYRACUSE, NEW YORK.

APPARATUS FOR TREATING CALCIUM HYDRATE.

SPECIFICATION forming part of Letters Patent No. 680,453, dated August 13, 1901.

Application filed December 28, 1900. Serial No. 41,334. (No model.)

*To all whom it may concern:*

Be it known that I, MANSFIELD J. FRENCH, of Syracuse, in the county of Onondaga, in the State of New York, have invented new and useful Apparatus for Treating Calcium Hydrate, of which the following, taken in connection with the accompanying drawings, is a full, clear, and exact description.

This invention relates to apparatus for treating alkaline earths, and particularly calcium hydrate, one object being to provide means whereby a large mass of hydrate may be speedily and uniformly dehydrated and the water of crystallization driven off without liability of overheating or baking any part of the mass.

A further object of this invention is to so construct and support the receptacle for receiving the hydrate that the same may be readily charged and discharged and attended to by an ordinary unskilled operator.

To this end the invention consists in the construction and arrangement of the parts of a dehydrating apparatus, as hereinafter fully described, and pointed out in the claims.

Figure 1 is a longitudinal section of my invention. Fig. 2 is a transverse section taken on line 2 2, Fig. 1.

This invention consists, essentially, of an open-ended receptacle pivotally supported at substantially its central portion upon suitable supports and connected to any desired form of heating device for supplying steam and hot air to the interior of the receptacle. This receptacle preferably consists of an outer inclosing shell 1, an inner perforated shell 2, a substantially central perforated tube 3, perforated end walls 4, and suitable closures or caps 6. The intermediate portion of the outer shell 1 is preferably cylindrical in form, is provided with an annular band 7, having trunnions 8 secured thereto and journaled in suitable bearings 9, presently described. The opposite ends of the outer shell 1 are preferably conical in form, being truncated at their ends and provided with openings for receiving the material to be treated. The small ends of the conical portions of the outer shell are usually surrounded by reinforcing-rings 10, having slotted annular flanges 11 for receiving clamping-bolts, presently described.

The inner perforated shell 2 is generally of substantially the same form as the outer shell, having a substantially cylindrical intermediate portion and truncated conical ends and is formed of less diameter than the outer shell for forming a steam or hot-air chamber 12 between the adjacent walls of said inner and outer shells.

In order to properly support the inner perforated shell 2, which is necessarily formed of thin screen metal, and to prevent buckling or other injury to the perforated shell, I usually interpose between said shells a series of stay-bolts 13, of any desired construction, for holding the walls of said inner and outer shells in separated relation to each other. This inner wall 2 is generally perforated throughout its entire surface for permitting the heated products in the chamber 12 to be uniformly distributed through the mass of material which is supported within the perforated shell 2.

The central tube 3 is removably supported within the inner shell 2, is generally perforated throughout its entire length, and is preferably formed of less length than the distance between the end walls 4, its opposite ends being provided with removable perforated caps 14 for preventing entrance of the material to be treated into said tube. The means for supporting this central tube usually consists of collars 15, provided with set-screws 16, which are adapted to engage the tube for holding the same in its adjusted position and permitting the tube to be removed when desired. The collars 15 are held in position by suitable braces or arms 17, having their inner ends secured to their respective collars and their outer ends extended through the perforated inner wall 2 and secured by suitable fastening means to the outer shell 1 in proximity to its opposite ends.

It is evident from the foregoing description that the outer and inner shells 1 and 2 are open at their opposite ends, the open ends of the inner shell being adapted to receive the material to be treated and the open ends of the outer shell being adapted to receive superheated steam or hot air and discharging the same into the chamber 12, from which chamber said superheated steam or hot air is distributed through the perforations of the inner wall to the material to be treated. In like manner the superheated steam or hot air is adapted to enter the central tube 3, which also serves to distribute the steam or hot air through the perforations to the material adjacent thereto.

The rings 10 are usually formed with annular recesses extending inwardly from their end faces for forming suitable shoulders 18. The end walls 4 are arranged in these recesses, being supported by the shoulders 18, and the perforations of said end walls usually extend over their entire surface and communicate with the interior of the inner shell and also with the chamber 12, between the inner and outer shells. The end edges of the inner and outer shells 1 and 2 preferably terminate in a plane substantially coincident with the annular shoulders 18, and the end walls 4 are arranged to abut against said end faces and are removable outwardly therefrom when desired to discharge the dehydrated material from the receptacle or to recharge the same with the material to be treated.

The end caps or closures 6 serve to close the openings in the opposite ends of the outer and inner shells, are detachably secured to the flanges 11, their outer portions being separated from the perforated end walls 4 for forming suitable steam or hot-air chambers 20, and are each provided with apertures 21 and 22, one of which is adapted to conduct the steam to the chamber 20 and the other may serve to discharge water from the receptacle and is also arranged to conduct hot air to said chamber. These openings are provided with suitable conduits which may be connected to any desired form of heater (not necessary to herein illustrate or describe) for supplying superheated steam and hot air to the receptacle. The caps or closures 6 are held in position by suitable clamping means, as bolts 23, which are inserted into the slots of the flanges 11 and similar slots formed in the flanges of the caps or closures 6. This means of connection being common to such apparatus it is unnecessary to further illustrate or describe the same.

As previously stated, the trunnions 8 for supporting the receptacle are mounted in suitable bearings 9, which may be supported in any desired manner, as by means of I-beams 24. This supporting means, however, forms no part of my present invention and it is unnecessary to further illustrate or describe the same.

In the operation of my invention one of the closures or caps 6 and the adjacent perforated end wall 4 are removed and the material to be treated is dumped or otherwise inserted within the inner perforated shell surrounding the central tube 3. The removed walls 4 and 6 are then placed in position and securely clamped in place. The superheated steam is then admitted through one of the conduits, as 21, which passes into the chamber 20 through the perforated walls 4, and owing to the fact that the mass of material retards the passage of the steam endwise therethrough it is evident that a portion of the steam passes into the chamber 12 and is evenly distributed through the perforations in the walls of the inner shell to the material which is being treated. It is also evident that some of the steam passing through the perforated end walls 4 enters the central perforated conduit 3 and facilitates the even distribution of the steam into the material. This steam may be heated to any desired degree before entering the receptacle, and it is evident that the even distribution of the steam throughout the entire mass of material, as described above, liberates the water of crystallization contained in the hydrate, and when said mass is sufficiently heated by the steam the steam is drawn off and a current of hot air is admitted through the other conduit, as the conduit 22, which is distributed throughout the entire mass of material in the same manner as described for the steam, thereby removing the moisture from the hydrate, it being understood that when the steam or hot air is admitted at one end of the receptacle the conduits at the opposite end are more or less open for permitting the escape of the cold air during admission of steam and for permitting the water-saturated vapor to pass off freely when the hot air is being introduced through said mass. After the material has been treated in the manner just described by the superheated steam and hot air it may be readily removed from either end by removing either of the end walls 4 and 6 and inverting the receptacle upon the trunnions 8. By supporting the receptacle upon the trunnions 8 it is evident that the said receptacle may be tilted to any desired position for convenience of charging and discharging and also for permitting the material to be agitated should it become caked or baked in the receptacle.

The operation of my invention will now be readily understood upon reference to the foregoing description and the accompanying drawings, and it will be evident that some change may be made in the detail construction and arrangement of the parts of my invention without departing from the spirit thereof. Therefore I do not limit myself to the precise construction and arrangement shown and described.

Having thus described my invention, what I claim, and desire to secure by Letters Patent, is—

1. An apparatus for treating calcium hydrate comprising a receptacle having its opposite ends provided with openings for receiving and discharging the material, said receptacle consisting of outer and inner shells, the inner shell being perforated and of less diameter than the outer shell for forming a space or passage from end to end and entirely around the inner shell, perforated transverse walls across the open ends of the receptacle and having some of their perforations communicating with the space between the outer and inner shells, and closures for the end openings having passages for the steam, water or hot air.

2. An apparatus for treating calcium hydrate comprising a receptacle having its opposite ends provided with openings for receiving and discharging the material, said receptacle consisting of outer and inner shells, the inner shell being perforated and of less diameter than the outer shell for forming a space or passage from end to end and entirely around the inner shell, perforated transverse walls across the open ends of the receptacle and having some of its perforations communicating with the space between the outer and inner shells, closures for the end openings of the receptacle, said closures having their intermediate portions separated from the transverse perforated walls for forming distributing-chambers which communicate with each other through the space between the outer and inner shells, a substantially central lengthwise-perforated tube removably supported within the inner shell, and conduits communicating with the distributing-chambers.

3. An apparatus for treating calcium hydrate comprising a support, a receptacle having its intermediate portion provided with trunnions journaled on the support, the opposite ends of said receptacle being provided with openings for receiving and discharging the material, said receptacle consisting of outer and inner shells, the inner shell being perforated and formed of less diameter than the outer shell, closures for the end openings of the receptacle, transverse perforated walls interposed between the closures and the adjacent faces of the receptacle each of said closures being provided with steam, water or hot-air passages, and a substantially central lengthwise-perforated conduit removably supported within the receptacle between the transverse perforated walls.

In witness whereof I have hereunto set my hand this 15th day of December, 1900.

MANSFIELD J. FRENCH.

Witnesses:
H. E. CHASE,
MILDRED M. NOTT.